(12) United States Patent
Bødtcher-Hansen

(10) Patent No.: US 11,873,352 B2
(45) Date of Patent: Jan. 16, 2024

(54) PROCESS FOR PRODUCING A CARBON DIOXIDE NEUTRAL AND BIODEGRADABLE POLYMER AND PACKAGING PRODUCTS PRODUCED THEREOF

(71) Applicant: ECO Packaging ApS, Slagelse (DK)

(72) Inventor: Mads Bødtcher-Hansen, Slagelse (DK)

(73) Assignee: ECO Packaging ApS, Slagelse (DK)

( * ) Notice: Subject to any disclaimer, the term of this patent is extended or adjusted under 35 U.S.C. 154(b) by 548 days.

(21) Appl. No.: 17/281,391

(22) PCT Filed: Oct. 2, 2019

(86) PCT No.: PCT/DK2019/050294
§ 371 (c)(1),
(2) Date: Mar. 30, 2021

(87) PCT Pub. No.: WO2020/069711
PCT Pub. Date: Apr. 9, 2020

(65) Prior Publication Data
US 2022/0033542 A1    Feb. 3, 2022

(30) Foreign Application Priority Data

Oct. 3, 2018   (DK) ............................ PA 2018 00669

(51) Int. Cl.
*C08F 10/02*   (2006.01)
*C08J 3/20*    (2006.01)
*B29B 7/90*    (2006.01)

(52) U.S. Cl.
CPC .............. *C08F 10/02* (2013.01); *B29B 7/90* (2013.01); *C08J 3/203* (2013.01); *B29K 2023/06* (2013.01); *B29K 2995/006* (2013.01); *C08J 2323/06* (2013.01)

(58) Field of Classification Search
CPC ................ C08F 10/02; C08J 3/20; B29B 7/90

USPC ......................................................... 523/124
See application file for complete search history.

(56) References Cited

U.S. PATENT DOCUMENTS

| | | | |
|---|---|---|---|
| 2008/0103232 A1* | 5/2008 | Lake | C08L 101/16 523/124 |
| 2016/0333147 A1* | 11/2016 | Ferreira | C12N 11/18 |
| 2017/0299474 A1 | 10/2017 | Scally et al. | |
| 2018/0100060 A1 | 4/2018 | LaPray et al. | |

FOREIGN PATENT DOCUMENTS

| | | |
|---|---|---|
| CN | 108410007 A | 8/2018 |
| EP | 3162841 B1 | 3/2018 |
| WO | 2007125546 A1 | 11/2007 |
| WO | 2008055240 A1 | 5/2008 |
| WO | 2014035351 A1 | 3/2014 |

OTHER PUBLICATIONS

International Search Report and Written Opinion of the ISA/XN in PCT/DK2019/050294, dated Nov. 11, 2019; 20pgs.

* cited by examiner

*Primary Examiner* — Deve V Hall
(74) *Attorney, Agent, or Firm* — Haukaas Fortius PLLC; Michael Haukaas

(57) ABSTRACT

A process for producing a polymer material comprising: (a) providing a polymer material, which is carbon dioxide neutral and is selected from polyethylene, e.g. made from sugar cane ethanol, polypropylene and polystyrene, (b) providing a biodegradable additive, (c) blending the polymer material of step (a) with the biodegradable additive of step (b), wherein the biodegradable additive of step (b) is an organic mixture for the growing of naturally occurring organism comprising a fungal-bacterial mixture, e.g. a *Penicillium-Bacillus* mixture.

17 Claims, No Drawings

PROCESS FOR PRODUCING A CARBON DIOXIDE NEUTRAL AND BIODEGRADABLE POLYMER AND PACKAGING PRODUCTS PRODUCED THEREOF

CROSS-REFERENCE TO RELATED APPLICATIONS

This application is a National Stage filing under 35 U.S.C. § 371 of International Application No. PCT/DK2019/050294, filed Oct. 2, 2019, which claims the benefit of Danish Patent Application No. PA 2018 00669 filed Oct. 3, 2018, which applications are incorporated herein by reference.

The invention concerns a polymer material, in particular polyethylene, which is at least carbon dioxide neutral and fully biodegradable. The invention concerns also a packaging, such as a bottle, pot, or can, made from this polymer material. The invention relates also to the use of the packaging for the storage of health and pharmaceutical products. More particularly, the invention concerns a process for producing said carbon dioxide neutral and fully biodegradable polymer material, resulting from a process comprising the blending of polyethylene made from sugar cane ethanol with a biodegradable additive in the form of an organic mixture comprising a fungal-bacterial mixture. As an alternative, instead of polyethylene made from sugar cane ethanol, another polymer material, which is selected from polypropylene and polystyrene from a biological source, i.e. not a petrochemical source, is used.

Plastics are polymer-based materials, which are normally produced synthetically from fossil fuels. Packaging products such as containers, in particular cans, bottles and their caps, made from such plastics take normally 450 years or more to breakdown by nature and such breakdown actually only results in the degradation of the plastic into micro plastic. Hence, synthetic plastics never fully degrade and rather they break down into smaller and smaller pieces that are eventually ingested by for instance marine life. The negative impact on the environment is huge: for instance, estimates predict that by 2050 there will be more plastic in the oceans than there are fish. In addition, humans are already heavily exposed as estimates also indicate that an average person who eats seafood ingests up to 11000 pieces of micro-plastic every year. While recycling of plastics may mitigate part of this problem, it is by no means the only viable solution, since currently, only 9% of the world's plastic is recycled and not all plastic is in fact suitable for recycling and thus reusable.

BRP1001309A discloses a process of obtaining biodegradable polyesters by enzymatic catalysis, and uses of such biodegradable polyesters.

US2006039980A discloses a process of preparing a biodegradable polymer using an enzyme catalyst and a biodegradable polymer prepared through the process.

ES 2014344 discloses ethylenic polymers, which are degradable in the open air, capable of being simultaneously photodegradable and biodegradable by incorporating a load or charge of natural polymers such as an amide and its derivatives, sugars, and flour so as to increase the propensity of the polymer to microbial attack.

WO 2008055240 discloses additive material that is physically blended with polymeric material to create at least a partially biodegradable product. The additive may include: furanone, glutaric acid, hexadecanoic acid, polycaprolactone polymer, poly(lactic) acid, poly(glycolic) acid) and poly(lactic_co_glycolic acid), and a organoleptic swelling agent.

WO 2007/027163 A2 discloses a chemically degradable and/or biodegradable biaxially oriented polypropylene (BOPP) film that is suitable for all industrial applications such as packaging or non-packaging applications, in which the film is rendered biodegradable by addition of agents that promote the degradability by combination of heat and UV in a first step and absorption by micro-organism naturally present in soils in a second step. The BOPP film is characterized in that the layer(s) comprises degradable master batch or compound, this preferably being ligands such as octanoates, acetates, stearates, oleates, naphtenetes, linoleates, tallates and the like.

US 2016/0333147 A1 discloses a process for preparing a polymer/biological entities alloy by means of extrusion, drying and injection moulding, in which the biological entities can be enzymes, or microorganisms, that degrade the polymer. Specific embodiments of a polymer/enzyme alloy is polycaprolactone (CAPA)/lipase, and of polymer/microorganism alloy is polylactic acid (PLA)/bacterium, more specifically polylactic acid (PLA)/*Bacillus licheniformis*.

It is also known to produce biodegradable plastics by combining a synthetic base polymer, i.e. prepared from fossil fuels, such as polyethylene and polystyrene produced from fossil materials, with an organic compound, which significantly accelerates the biodegradability of such base polymers, i.e. conventional plastics, by means of enzymatic catalysis. For instance, the biodegradability of synthetic polyethylene by the provision of a *Penicillium-Bacillus* biofilm on the synthetic polyethylene material which enables subsequent degradation of the polyethylene surface by enzymatic reactions, has been published by Gamini Senevirate et al. in Current science 90(1): 20-21 Jan. 2006.

The prior art is silent about the provision of a process for producing a polymer, in which said polymer is not only fully biodegradable, but also carbon dioxide neutral, 100% recyclable and compliant with food safety and health regulations.

The prior art is also silent about a process for producing said polymer material in which the process includes the use of polyethylene made from sugar cane ethanol in combination with a biodegradable additive, and in which the additive is an organic mixture comprising a fungal-bacterial mixture.

It is therefore an object of the present invention to provide a process for the production of a plastic material, i.e. polymer material, which is carbon dioxide neutral and fully biodegradable.

It is yet another object of the present invention to provide a process for the production of a polymer material, which is also 100% recyclable and thus reusable.

It is another object of the present invention to provide a process for the production of a polymer material and products manufactured from said polymer, in particular packages such as containers that also comply with the food safety and health regulations of containers made from synthetic-based polymers.

These and other objects are solved by the present invention.

Accordingly, there is provided a process for producing a polymer material comprising the following steps:

(a) providing a polymer material which is carbon dioxide neutral in the form of polyethylene made from sugar cane ethanol, (b) providing a biodegradable additive, (c) blending the polymer material of step (a) with the biodegradable additive of step (b), wherein the blending ratio of polymer material of step (a) to biodegradable additive of step (b) is 90-98 to 10-2 wt. %, preferably 90-97 to 10-3 wt.%, and the amounts sum up to 100% wt., and wherein the biodegradable additive of step (b) is an organic mixture for the growing of naturally occurring organisms comprising a fungal-bacterial mixture, preferably as a biofilm on said polyethylene and which also creates enzymes and acids for effecting enzymatic catalysis.

The base polymer material, i.e. the polymer material of step (a) is thus carbon dioxide neutral and specifically selected to be polyethylene made from sugar cane ethanol.

By carbon dioxide-neutral is meant that the net production of carbon dioxide in the production of such polymer material is zero or negative.

There is normally a conception that a relatively high content of the biodegradable material of step (b) in the blend results in the deterioration of the characteristics or properties that are desirable to preserve in synthetic polymers, particularly polyethylene made from fossil fuels, or the polymer material of step (a). According to the invention, the amount of material (b) in the blend is 2-10% wt., preferably 3-10% wt. These ranges represent relatively high concentrations, yet it was surprisingly found that even at such high concentrations of material (b), the required properties in the polymer material and products obtained therefrom are preserved, including compliance with food safety regulations and which normally are only present in products made from synthetic based polymers.

Due to its origin from sugar cane, which consumes carbon dioxide during its growth, the polyethylene is $CO_2$-neutral. Moreover, it has been found that by combining the polyethylene material of step (a) with the biodegradable additive of step (b) in the above blending ratios (90-97 to 10-3 wt %), not only is it possible to enable the production of a fully biodegradable polymer material, specifically here a fully biodegradable polyethylene, but also a polymer material which keeps the original properties of the base polymer, i.e. polyethylene made from sugar cane ethanol. Thus, the resulting polymer material is a polymer being $CO_2$-neutral, fully biodegradable and not least 100% recyclable also. The interaction of the biodegradable additive with other base polymers which are non-synthetic and which may even be $CO_2$-neutral, such as base polymers based from starch and proteins, does not result in a 100% recyclable polyethylene material or a biodegradable polymer.

The thus resulting polymer material according to the process of the invention is also a fully degradable polyethylene (PE) material.

By "fully degradable" is meant that the polyethylene material according to the invention can biodegrade by a weight loss of 90% or more within 1-10 years in an aerobic environment. This compares with synthetic polyethylene, which normally will take 10 years to biodegrade by only 0.2% in the same aerobic environment, i.e. 0.2% weight loss within 10 years. In addition, the polyethylene material according to the invention can biodegrade in an anaerobic environment (landfill) by a weight loss of about 47% in 27 days, compared to synthetic polyethylene only being partially degraded in 32 years. Further, the polyethylene material according to the invention can biodegrade in waste water about 24% in 63 days, while synthetic polyethylene shows no signs of deterioration or degradation in 12 years. Also in marine water the polyethylene according to the invention biodegrades about 24% in 42 (no data available for synthetic polyethylene).

The resulting polymer material may also be regarded as a composite polymer material, i.e. a composite polyethylene (PE-and-fungal-bacterial-mixture).

Preferably, the polyethylene polymer of step (a) is a so-called green polyethylene publicly available under the trade name: I'm green™ PE.

The biodegradable additive of step (b) is preferably an organic mixture for the growing of naturally occurring organisms comprising a fungal-bacterial mixture, preferably as a biofilm on the polymer material of step (a) i.e. polyethylene made from sugar cane ethanol, and which also creates enzymes and acids for effecting enzymatic catalysis. The enzymatic catalysis breaks down the polymer material, i.e. polyethylene, into carbon dioxide, water and biomass in a so-called aerobic degradation, while in a so-called anaerobic degradation the enzymatic catalysis breaks down the polyethylene into carbon dioxide, methane and biomass.

In another particular embodiment, the fungal-bacterial mixture is *Penicillium-Bacillus*. This microorganism enables the creation of a bio-film particularly suitable for the biodegradation of the polyethylene material of step (a). The fungus in the form of *Penicillium frequentans* provides for the formation of a network of mycelia on the base polyethylene, which is then colonized by the bacterium *Bacillus mycoides*. The microorganism then uses the base polymer material, i.e. polymer material of step (a), i.e. polyethylene, as the carbon source.

Preferably, the biodegradable additive is an organic mixture publicly available under the trade name POLY-BI® or POLYDEGRADE™.

In another embodiment, the blending ratio is 95-97 to 5-3 wt %. At too low concentrations of material (b), the formation of the biofilm is difficult to obtain, thus making it also more difficult to sustain a biodegradation process throughout the whole polyethylene material. At too high concentrations of material (b), the original properties of the polyethylene may be impaired, in particular compliance with food and health safety regulations. At the above particular blending ratios, the best trade-off of these opposites is obtained.

In an embodiment, the polyethylene material of step (a) and the biodegradable additive of step (b) are provided in granular form. This enables direct processing of such granules according to standard polymer processing. The selection of the adequate particle size of the granules is within the immediate reach of any skilled person in the art of polymer processing. Likewise, the selection of the proper temperature is within the immediate reach of any skilled person in the art of polymer processing. Typically, the temperature is around the melting point of polyethylene, e.g. 105-115° C. for low-density polyethylene (LDPE).

In an embodiment, step (c) is conducted by a polymer processing stage selected from: extrusion, moulding, such as injection moulding and blow moulding, calendaring moulding, rotational moulding, and combinations thereof. Extrusion is in particular advantageous, since this polymer processing technology enables a proper mixing of the granules of the materials of step (a) and (b) by gradually melting the mixture being fed to a hopper into a barrel of the extruder as it is transported by means of a screw along the length direction of the barrel towards the extruder outlet. The melting results from the mechanical energy of the turning screw and heater elements in the barrel. The molten material is then cooled, thus resulting in the fully biodegradable polymer material. Hence, in a particular embodiment, step (c) is conducted only by extrusion. The invention encompasses also a packaging manufactured from the polymer material of any of the above embodiments. Preferably, said packaging is any of: a bottle, a pot, a can, a cap, or a lid. No need for changes in the standard polymer processing technology to manufacture the packaging products is required with respect to when using synthetic polymers, in particular synthetic polyethylene, thus making the transition from the use of synthetic polymers to the resulting polymers of the invention completely seamless and straightforward.

As used herein, the term "packaging" means a material used to enclose, contain or cover or close something, such as a container or receptacle in the form of a bottle, a pot, a can, a cap or a lid.

As used herein, the term "cap" means a protective lid for a container, such as protective lid for a bottle or a pot.

The terms "cap" and "lid" are used interchangeably throughout this patent application.

As used herein, the term "can" means a container or receptacle in which products may be sealed for preservation until use.

The polyethylene of step (a) is suitably in the form of a high-density-polyethylene (HDPE) or a low-density-polyethylene (LDPE). HDPE is particularly suitable for manufacture of bottles, while LDPE is particularly suitably for the manufacturing of caps/lids, e.g. caps used in the bottles.

In another embodiment, the packaging polymer material represents at least 98% of the weight of the packaging, preferably at least 99% of the weight of the packaging. Accordingly, other additives, up to 2 wt. %, preferably up to 1 wt. %, may be added to the above fully biodegradable material composition, for instance pigments to provide a final desired appearance on a bottle, pot, can or cap/lid.

The packaging according to the invention has a biodegradability rate of at least 90% weight loss over 180 days in an aerobic environment as measured by ISO 14855 and at least 45% weight loss over 27 days in an anaerobic environment (landfill) as measured by ISO 15985. This compares with less than 0.2% weight loss in an aerobic environment in 10 years and only partly degraded in 32 years in an anaerobic environment for synthetic polyethylene materials. In addition, the packaging according to the invention degrades about 24% in 63 days in wastewater compared to no signs of deterioration in 12 years for synthetic polyethylene. Also, in marine water the packaging according to the invention degrades about 24% in 42 days.

The invention encompasses also the use of the packaging according to any of the above embodiments for the storage of health and pharmaceutical products. Because of the surprising effect of the packaging material being able to comply with food safety and health regulations as containers or packaging made from synthetic based polymers, the use for the storage of health and pharmaceutical products is now also possible. Suitably, such products are in the form of capsules, tablets, pills, or powder, and the invention enables therefore also the pharmaceutical and health industry to significantly reduce the environmental concerns related to the use of current packing based on synthetic polymers, in particular synthetic polyethylene.

By the present invention, degradation of the packaging will not occur when stored in a warehouse, or on shelves, or when exposed to heat and sunlight. The degradation, more specifically the biodegradation will only occur when the package is exposed to an environment showing a biologically active ecosystem.

The invention encompasses also the use of the polymer material produced according to any of the above embodiments in the production of articles selected from the group of: bags, films, membranes, pipes, fibres, toys, picnic ware, kitchenware, insulation and fuel tanks.

The invention encompasses also a process in which the polymer material of step (a) is made from a biological source, i.e. not petrochemical source, hence preferably also carbon dioxide neutral, and selected from polypropylene and polystyrene, as recited in points 13-24 farther below.

The invention will now be further described by the following example:

Ninety seven (97) parts by weight of a high density polyethylene (HDPE) made from sugar cane ethanol (material (a)) and which is publicly accessible under the trade name I'm green™ PE or Green Polyethylene and provided in granular form, was fed into the hopper of an the extruder together with three (3) parts by weight of a biodegradable additive (material (b)) in the form granules of an organic mixture publicly available under the trade name POLY-BI® or POLYDEGRADE™. The extrusion process was conducted according to the same standard process that would apply for any synthetic polymer. The extrusion process provides the mixing and melting of the two materials (a) and (b), thus resulting, without the need of changing any steps or parameters normally used in the extrusion, in a polyethylene material, which is readily used for the manufacturing of bottles, pots or cans.

The resulting polyethylene material and bottles manufactured therefrom was subjected to a number of biodegradability tests. In a biodegradability test under an aerobic environment according to ISO 14855, the resulting polyethylene material shows at least 90% weight loss over 180 days, more specifically 93% biodegradation in 180 days. This is clearly a huge improvement with respect to synthetic polyethylene, which is reported to show a weight loss of less than 0.2% in a period of 10 years. When measured under anaerobic conditions according to ISO 15985, the weight loss is at least 45% weight loss over 27 days, whereas a synthetic polyethylene only partly degraded in a period of 32 years. The resulting polyethylene material was then further manufactured into HDPE bottles. When measured under anaerobic conditions in an aquatic system (wastewater) according to ISO 14853, the weight loss is about 25% in 63 days, whereas a synthetic polyethylene shows no signs of deterioration over a period of 12 years. When measured under aerobic conditions in a marine environment (marine water), the weight loss is about 24% in 42 days. These were further tested for compliance with food and healthy regulations and passed all the respective tests, in line with packaging products made from synthetic polyethylene.

When the biodegradability test under an aerobic environment according to ISO 14855 is applied to polypropylene (PP) and polystyrene (PS) made from a biological source, i.e. not a petrochemical source, they biodegrade about 82% and 45%, respectively, in 180 days.

The invention is characterised by the following points:

1. A process for producing a polymer material comprising the following steps:

(a) providing a polymer material, which is carbon dioxide neutral in the form of polyethylene, made from sugar cane ethanol, (b) providing a biodegradable additive, (c) blending the polymer material of step (a) with the biodegradable additive of step (b), wherein the blending ratio of polymer material of step (a) to biodegradable additive of step (b) is 90-98 to 10-2 wt. %, preferably 90-97 to 10-3 wt. %, and the amounts sum up to 100% wt., and wherein the biodegradable additive of step (b) is an organic mixture for the growing of naturally occurring organisms comprising a fungal-bacterial mixture, preferably as a biofilm on said polyethylene and which also creates enzymes and acids for effecting enzymatic catalysis.

2. The process according to point 1, wherein said fungal-bacterial mixture is *Penicillium-Bacillus*.

3. The process according to any preceding point, wherein the blending ratio is 95-97 to 5-3 wt. %.

4. The process according to any preceding point, wherein the polymer material of step (a) and the biodegradable additive of step (b) are provided in granular form.

5. The process according to any preceding points, wherein step (c) is conducted by a polymer processing stage selected from: extrusion, moulding, such as injection moulding and blow moulding, calendaring moulding, rotational moulding, and combinations thereof.

6. The process according to points 4 and 5, wherein step (c) is conducted only by extrusion.

7. A packaging manufactured from the polymer material produced according to any of points 1-6.

8. A packaging according to point 7 wherein said packaging is any of: a bottle, a pot, a can, or a cap.

9. A packaging according to any of points 7-8 wherein said polymer material represents at least 98% of the weight of the packaging, preferably at least 99% of the weight of the packaging.

10. A packaging according to any of points 7-9 having a bio-degradability rate of at least 90% weight loss over 180 days in an aerobic environment as measured by ISO 14855 and at least 45% weight loss over 27 days in an anaerobic environment as measured by ISO 15985.

11. Use of the packaging according to any of points 7-10 for the storage of health and pharmaceutical products.

12. Use of the polymer material produced according to any of points 1-6 in the production of articles selected from the group of: bags, films, membranes, pipes, fibres, toys, picnic ware, kitchenware, insulation and fuel tanks.

13. A process for producing a polymer material comprising the following steps:
(a) providing a polymer material which is made from a biological source, i.e. not a petrochemical source, selected from polypropylene and polystyrene,
(b) providing a biodegradable additive,
(c) blending the polymer material of step (a) with the biodegradable additive of step (b),
wherein the blending ratio of polymer material of step (a) to biodegradable additive of step (b) is 90-98 to 10-2 wt. %, preferably 90-97 to 10-3 wt. %, and the amounts sum up to 100% wt., and
wherein the biodegradable additive of step (b) is an organic mixture for the growing of naturally occurring organisms comprising a fungal-bacterial mixture, preferably as a biofilm on said polyethylene and which also creates enzymes and acids for effecting enzymatic catalysis.

14. The process according to point 13, wherein said fungal-bacterial mixture is *Penicillium-Bacillus*.

15. The process according to any of points 13-14, wherein the blending ratio is 95-97 to 5-3 wt. %.

16. The process according to any of points 13-15, wherein the polymer material of step (a) and the biodegradable additive of step (b) are provided in granular form.

17. The process according to any of points 13-16, wherein step (c) is conducted by a polymer processing stage selected from: extrusion, moulding, such as injection moulding and blow moulding, calendaring moulding, rotational moulding, and combinations thereof.

18. The process according to points 16 and 17, wherein step (c) is conducted only by extrusion.

19. A packaging manufactured from the polymer material produced according to any of points 13-18.

20. A packaging according to point 19 wherein said packaging is any of: a bottle, a pot, a can, or a cap.

21. A packaging according to any of points 19-20 wherein said polymer material represents at least 98% of the weight of the packaging, preferably at least 99% of the weight of the packaging.

22. A packaging according to any of points 19-21 having a bio-degradability rate of at least 90% weight loss over 180 days in an aerobic environment as measured by ISO 14855 and at least 45% weight loss over 27 days in an anaerobic environment as measured by ISO 15985.

23. Use of the packaging according to any of points 19-22 for the storage of health and pharmaceutical products.

24. Use of the polymer material produced according to any of points 13-18 in the production of articles selected from the group of: i) where in step (a) the polymer material is polypropylene: plastic laboratory supplies such as beakers, test tubes, and flasks, and plastic parts for the automotive industry, ii) where in step (a) the polymer material is polystyrene: thermal insulation, CD cases, and appliance housings.

The invention claimed is:

1. A process for producing a polymer material comprising the following steps:
(a) providing a polymer material, wherein the polymer material is carbon dioxide neutral, and in the form of polyethylene made from sugar cane ethanol,
(b) providing a biodegradable additive,
(c) blending the polymer material of step (a) with the biodegradable additive of step (b), wherein the blending ratio of polymer material of step (a) to biodegradable additive of step (b) is 90-98 wt. % of the polymer material to 10-2 wt. % of the biodegradable additive, and the amounts sum up to 100% wt., wherein the biodegradable additive of step (b) is an organic mixture for the growing of naturally occurring organisms comprising a fungal- bacterial mixture on said polyethylene, wherein the fungal-bacterial mixture produces enzymes and acids for effecting enzymatic catalysis.

2. The process according to claim 1, wherein the blending ratio is 95-97 wt. % of the polymer material to 5-3 wt. % of the biodegradable additive.

3. The process according to claim 1, wherein the polymer material of step (a) and the biodegradable additive of step (b) are provided in granular form.

4. The process according to claim 1, wherein step (c) is conducted by a polymer processing stage selected from extrusion or moulding, wherein the moulding comprises injection moulding and blow moulding, calendaring moulding, rotational moulding, and combinations thereof.

5. The process according to claim 4, wherein step (c) is conducted only by extrusion.

6. A polymer material produced by the process of claim 1.

7. A packaging manufactured from the polymer material of claim 6.

8. The packaging according to claim 7, wherein said packaging is: a bottle, a pot, a can, or a cap.

9. The packaging according to claim 7, wherein said polymer material comprises at least 98% of the weight of the packaging.

10. The packaging according to claim 7 having a bio-degradability rate of at least 90% weight loss over 180 days in an aerobic environment as measured by ISO 14855 and at least 45% weight loss over 27 days in an anaerobic environment as measured by ISO 15985.

11. A process for storing health and pharmaceutical products comprising storing health and pharmaceutical products in the packaging according to claim 7.

12. A process for producing an article comprising forming an article selected from the group of: bags, films, membranes, pipes, fibres, toys, picnic ware, kitchenware, insulation and fuel tanks, wherein the article comprises a polymer material according to claim 6.

13. The process of claim 1 wherein the blending ratio of the polymer material of step (a) to the biodegradable additive of step (b) is 90-97 wt. % of the polymer material to 10-3 wt. % of the biodegradable additive.

14. The process of claim 1 wherein the fungal-bacterial mixture forms a biofilm.

15. The process of claim 1 wherein the fungal-bacterial mixture comprises a *Penicillium* species and a *Bacillus* species.

16. The process of claim 15 wherein the *Penicillium* species is *Penicillium* frequentans and the *Bacillus* species is *Bacillus mycoides.*

17. The packaging according to claim 7 wherein the polymer material comprises at least at least 99% of the weight of the packaging.

\* \* \* \* \*